US012806898B2

(12) United States Patent
Son

(10) Patent No.: US 12,806,898 B2
(45) Date of Patent: Nov. 24, 2026

(54) DROPLET INSPECTION METHOD AND DEVICE USING 2-DIMENSIONAL IMAGE OF DROPLET

(71) Applicant: SEMES CO., LTD., Chungcheongnam-do (KR)

(72) Inventor: Sang Uk Son, Suwon-si (KR)

(73) Assignee: SEMES CO., LTD., Chungcheongnam-Do (KR)

( * ) Notice: Subject to any disclaimer, the term of this patent is extended or adjusted under 35 U.S.C. 154(b) by 311 days.

(21) Appl. No.: 18/402,731

(22) Filed: Jan. 3, 2024

(65) Prior Publication Data

US 2024/0278553 A1 Aug. 22, 2024

(30) Foreign Application Priority Data

Feb. 21, 2023 (KR) ........................ 10-2023-0022729

(51) Int. Cl.
*B41J 2/045* (2006.01)
*G01N 15/0227* (2024.01)

(52) U.S. Cl.
CPC ....... *B41J 2/04535* (2013.01); *B41J 2/04508* (2013.01); *G01N 15/0227* (2013.01)

(58) Field of Classification Search
CPC ............... B41J 2/04535; B41J 2/04508; B41J 2/04586; B41J 2/04558; B41J 2/01; B41J 2/07; B41J 2/0456; B41J 2029/3935; G01N 15/0227; G01N 2015/1493; G01N 2015/1497; G01N 15/1433; G01N 2015/0026; G01N 15/1468; G01N 15/227; G06K 15/027; G01B 11/08; G06T 1/0007; G06T 7/62; G06T 2207/30144
See application file for complete search history.

(56) References Cited

U.S. PATENT DOCUMENTS

| | | | | |
|---|---|---|---|---|
| 12,109,806 B2 * | 10/2024 | Lee | ........................ | B41J 2/2142 |
| 2023/0066695 A1 | 3/2023 | Son et al. | | |

FOREIGN PATENT DOCUMENTS

| | | | | |
|---|---|---|---|---|
| JP | 2006-167534 | 6/2006 | | |
| KR | 10-2011-0121414 | 11/2011 | | |
| KR | 20130060508 A * | 6/2013 | ............ | B41J 29/393 |
| KR | 10-1396216 | 5/2014 | | |
| KR | 10-2022-0090286 | 6/2022 | | |
| KR | 10-2023-0029221 | 3/2023 | | |
| WO | WO-2018204791 A1 * | 11/2018 | ............. | G01F 22/02 |

* cited by examiner

*Primary Examiner* — Jason S Uhlenhake
(74) *Attorney, Agent, or Firm* — WOMBLE BOND DICKINSON (US) LLP

(57) ABSTRACT

A droplet inspection method using a 2-dimensional (2D) image of a droplet includes ejecting ink onto a substrate based on a preset inspection pattern using an inkjet head, acquiring a 2D image of the droplet of ink ejected to a plurality of positions on the substrate using a measurement camera located on a side surface or above the substrate, and calculating a diameter of the droplet from the 2D image and calculating a volume of the droplet using the calculated diameter of the droplet and a pre-measured contact angle of the substrate for inspection.

19 Claims, 6 Drawing Sheets

$$V = \int \pi x^2 dy = \int_{\frac{l}{\tan\theta_c}}^{r} \pi(r^2 - y^2)dy = \pi\left[\frac{2}{3}r^3 - \frac{l}{\tan\theta_c}r^2 + \frac{1}{3}\left(\frac{l}{\tan\theta_c}\right)^3\right]$$

$$= \pi r^3\left[\frac{2}{3}\left(\frac{1}{\sin\theta_c}\right)^3 - \frac{\cos\theta_c}{(\sin\theta_c)^3} + \frac{1}{3}\left(\frac{1}{\tan\theta_c}\right)^3\right]C$$

*D* : *Drop Radius*
$\theta_c$ : Contact Angle
C : Correction Factor

[CHANGE IN VOLUME ACCORDING TO CHANGE IN SUBSTRATE FOR INSPECTION]

[AVERAGE VOLUME CHANGE ACCORDING TO CHANGE IN SUBSTRATE FOR INSPECTION IS CORRECTED]

DROPLET INSPECTION METHOD AND DEVICE USING 2-DIMENSIONAL IMAGE OF DROPLET

CROSS-REFERENCE TO RELATED APPLICATION(S)

This application claims benefit of priority to Korean Patent Application No. 10-2023-0022729 filed on Feb. 21, 2023 in the Korean Intellectual Property Office, the disclosure of which is incorporated herein by reference in its entirety.

BACKGROUND

1. Field

The present disclosure relates to a droplet inspection method and a droplet inspection device using two-dimensional (2D) images of droplets.

2. Description of Related Art

Inkjet printing technology is technology that directly creates patterns by spraying a chemical solution with a volume of several tens of picoliters or less onto a substrate, the subject of printing, at a frequency of hundreds of times per second or more using electrical or magnetic force or pneumatic pressure.

Inkjet printing technology may be used in patterning processes for displays and semiconductors, the importance of which has recently been emphasized due to the rapid development of information and communications technology and the expansion of the market therefor.

The related art patent document discloses a method of optimizing a driving signal of a droplet discharge head by measuring the amount of droplets to determine whether a droplet state is appropriate before performing inkjet printing, and a measurement operation of measuring a contact diameter, a contact angle, or a height of a droplet, which is numerical data specifying a lateral shape of the droplet deposited on one surface and a calculation operation of calculating the amount of droplets are performed.

However, calculating the amount of droplets by measuring the contact angle of the side shape of the droplet in real time each time printing is performed requires a lot of time and costs, making it difficult to quickly check a status of the droplet discharge head, and in particular, when the contact angle and height are measured by imaging the droplet from a side surface of the droplet, it is very difficult to be applied to equipment to measure multiple droplets at high speed simultaneously.

In addition, if a camera is moved in a height direction to measure multiple droplets simultaneously, it may be difficult to extract the height of the droplets as the size of the droplets decreases or a camera depth of field increases, making it very difficult to be applied to equipment.

Therefore, there has been a need for a method and device that may perform droplet inspection on multiple droplets at high speed by calculating the height and volume of the droplets even without measuring the contact angle of the substrate each time the substrate is changed.

(Patent Document 1) JP 2006-167534 A

SUMMARY

An aspect of the present disclosure is to provide a droplet inspection method and a droplet inspection device using a two-dimensional image of a droplet, capable of calculating a height and volume of a droplet using a contact angle of a pre-measured substrate for inspection, without having to measure a contact angle of a substrate each time before measuring the volume of the droplet, and performing droplet inspection on multiple droplets at high speed simultaneously.

According to an aspect of the present disclosure, a droplet inspection method using a 2-dimensional (2D) image of a droplet includes: ejecting ink onto a substrate based on a preset inspection pattern using an inkjet head; acquiring a 2D image of the droplet of ink ejected to a plurality of positions on the substrate using a measurement camera located on a side surface or above the substrate; and calculating a diameter of the droplet from the 2D image and calculating a volume of the droplet using the calculated diameter of the droplet and a pre-measured contact angle of the substrate for inspection.

According to another aspect of the present disclosure, a droplet inspection method using a 2-dimensional (2D) image of a droplet includes: acquiring a reference image of the droplet of ink ejected from an inkjet head onto a substrate using a measurement camera; calculating a reference volume of the droplet by measuring a diameter of the droplet and a contact angle of the substrate from the reference image; receiving an actual volume of the droplet corresponding to the reference image and comparing the received actual image with the reference volume; determining a correction constant such that the reference volume matches the actual volume of the droplet; acquiring a contact angle of the substrate for inspection by correcting the contact angle of the substrate with a weight according to the determined correction constant; acquiring a 2D image of the droplet of ink ejected from the inkjet head to a plurality of positions on the substrate using the measurement camera; and calculating a diameter of the droplet from the 2D image and calculating a volume of the droplet using the calculated diameter of the droplet and the contact angle of the substrate for inspection.

According to another aspect of the present disclosure, an inkjet droplet volume measurement device using a 2-dimensional image of a droplet includes: an inkjet head located above a substrate and ejecting a droplet of ink onto the substrate; a measurement camera located on a side surface or above the substrate, stopped at or movable from a plurality of positions of the substrate, and imaging a two-dimensional (2D) image of a droplet of ink ejected onto the substrate; and a controller receiving the 2D image from the measurement camera, calculating a diameter of the droplet and a contact angle of a substrate for inspection, and calculating a volume of the droplet using a real-time measured diameter of the droplet and a pre-measured contact angle of the substrate for inspection.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
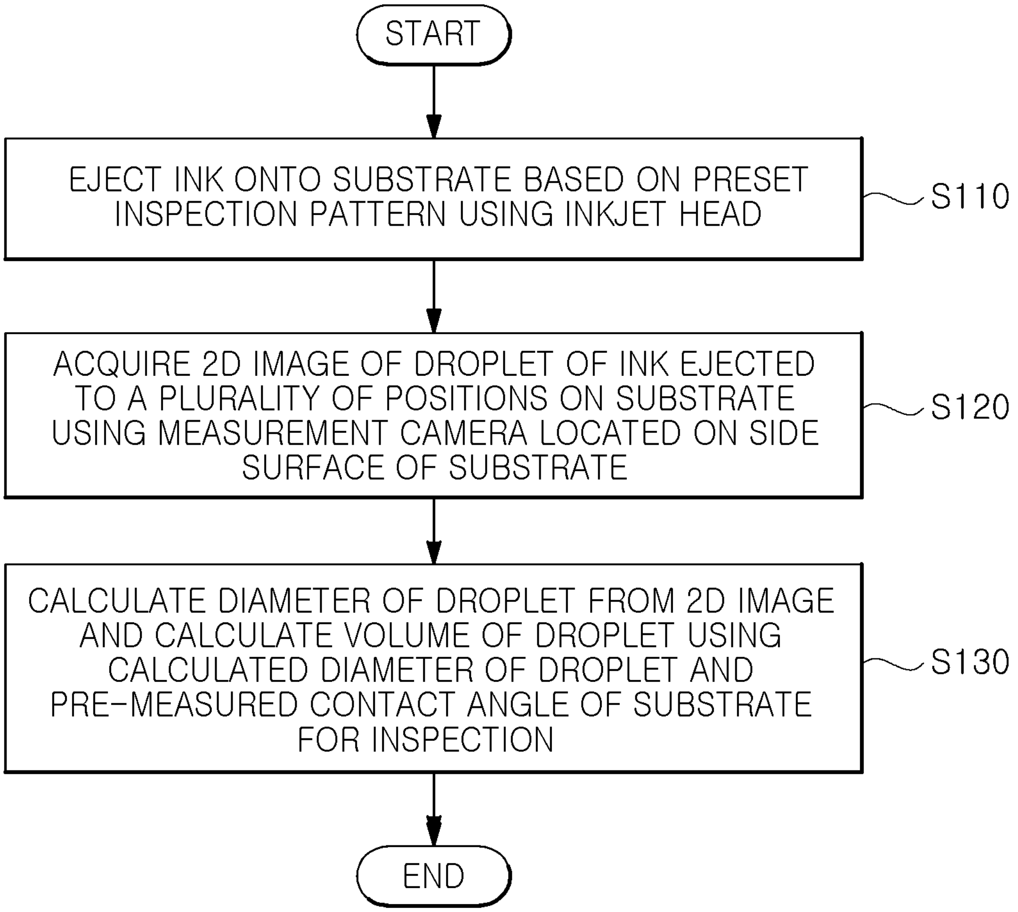
FIG. 1 is a flowchart of a droplet inspection method using a two-dimensional (2D) image of a droplet according to an exemplary embodiment in the present disclosure.

Hereinafter, exemplary embodiments will be described in detail with reference to the accompanying drawings such that they may be easily practiced by those skilled in the art to which the present disclosure pertains. In describing the present disclosure, if a detailed explanation for a related known function or construction is considered to unnecessarily divert the gist of the present disclosure, such explanation will be omitted but would be understood by those skilled in the art. Also, similar reference numerals are used for the similar parts throughout the specification. In this disclosure, terms., such as "above," "upper portion," "upper surface," "below," "lower portion," "lower surface," "lateral surface," and the like, are determined based on the drawings, and in actuality, the terms may be changed according to a direction in which a device or an element is disposed.

It will be understood that when an element is referred to as being "connected to" another element, it may be directly connected to the other element or intervening elements may also be present. In contrast, when an element is referred to as being "directly connected to" another element, no intervening elements are present. In addition, unless explicitly described to the contrary, the word "comprise" and variations., such as "comprises" or "comprising," will be understood to imply the inclusion of stated elements but not the exclusion of any other elements.

Hereinafter, a substrate may be a substrate for inspection, and a pattern formed on the substrate may be an inspection pattern performed to check a droplet ejection state and perform preliminary nozzle setting.

FIG. 1 is a flowchart of a droplet inspection method using a two-dimensional (2D) image of a droplet according to an exemplary embodiment in the present disclosure. The droplet inspection method and device using a 2D image of a droplet according to an exemplary embodiment in the present disclosure will be described below with reference to FIGS. 2 to 7.

Figure 2:
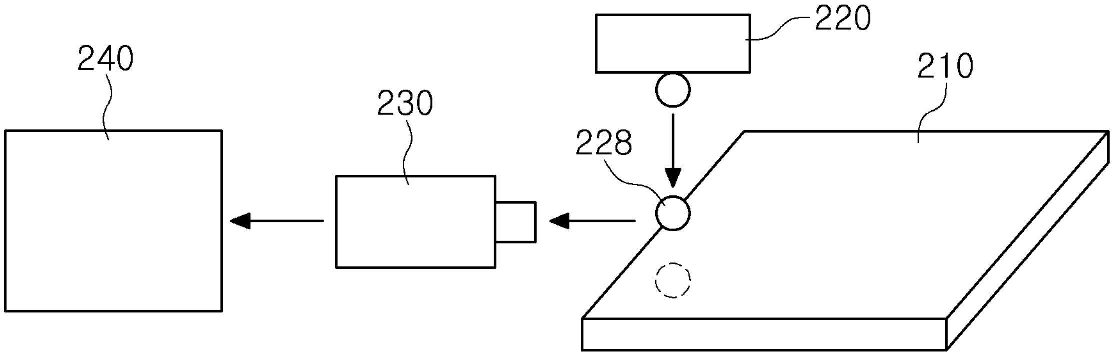
FIG. 2 is a block diagram schematically illustrating a configuration of a droplet inspection device using a 2D image of a droplet according to an exemplary embodiment in the present disclosure.

As shown in FIGS. 1 and 2, the droplet inspection method using a 2D image of a droplet according to an exemplary embodiment in the present disclosure may include an operation (S110) of ejecting ink onto a substrate 210 based on a preset inspection pattern using an inkjet head 220, an operation (S120) of acquiring a 2D image of a droplet 228 of ink ejected to a plurality of positions on the substrate 210 using a measurement camera 230 located on a side surface of the substrate 210 or above the substrate 210, and an operation (S130) of calculating a diameter of the droplet 228 from the 2D image and calculating a volume of the droplet using the calculated diameter of the droplet and a pre-measured contact angle of a substrate for inspection.

As shown in FIG. 2, an inkjet droplet volume measurement device according to an exemplary embodiment in the present disclosure may include the inkjet head 220 located above the substrate and ejecting the liquid 228 of ink onto the substrate 210, the measurement camera 230 located on the side surface of the substrate 210, stopped at or movable from a plurality of positions of the substrate 210, and capturing a 2D image of the liquid of ink ejected onto the substrate 210, and a controller 240 calculating a diameter of the droplet 228 and a contact angle θc of the substrate for inspection upon receiving the 2D image from the measurement camera 230 and calculating a volume of the droplet 228 using the real-time measured diameter of the droplet 228 and the pre-measured contact angle θc of the substrate for inspection.

As another exemplary embodiment, unlike FIG. 2, the measurement camera 230 may be located above the substrate 210 in a Z-axis direction and may move or stop on X- and Y-axis planes.

As an example, each time the controller 240 calculates the volume of the droplet 228, the controller 240 may calculate the contact angle θc of the substrate for inspection in advance, rather than calculating the contact angle upon receiving the 2D image from the measurement camera 230 in real time, calculate only the diameter of the droplet 228 in the 2D image, and calculate the volume of the droplet 228 using the contact angle θc of the substrate for inspection.

Figure 3:
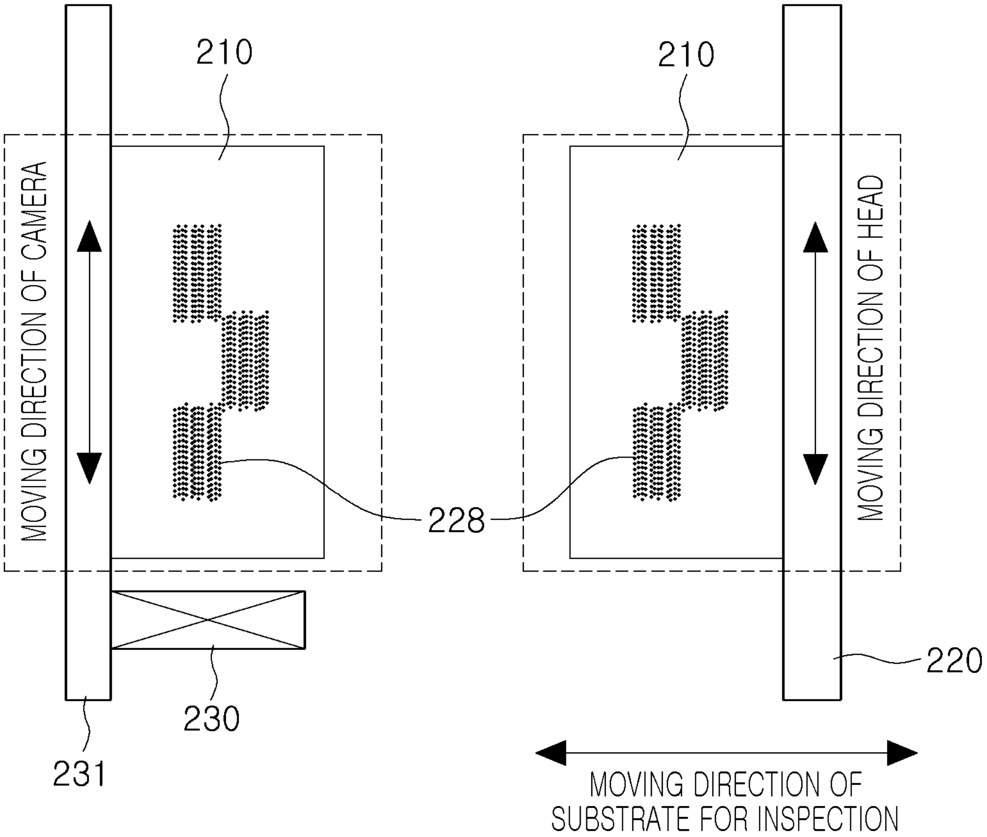
FIG. 3 schematically illustrates an operation of a droplet inspection device using a 2D image of a droplet according to an exemplary embodiment in the present disclosure.

As shown in FIG. 3, the measurement camera 230 connected to a measurement camera support 231 moves or stops in one direction based on the measurement camera support 231 located on the side or above the substrate 210 to image the droplet 228 from above or the side surface, or the measurement camera 230 may be fixed to an upper side or the side surface, while the substrate 210 may move or stop in another direction. At this time, the upper side or the side surface may include an oblique position between the upper side and the side surface.

Since the measurement camera 230 performs imaging from the upper side or the side surface of the droplets 228, a 2D image may be acquired for a plurality of droplets 228 at high speed simultaneously.

In addition, before the method, an operation of previously measuring the contact angle θc of the substrate for inspection may be further included.

Figure 4:
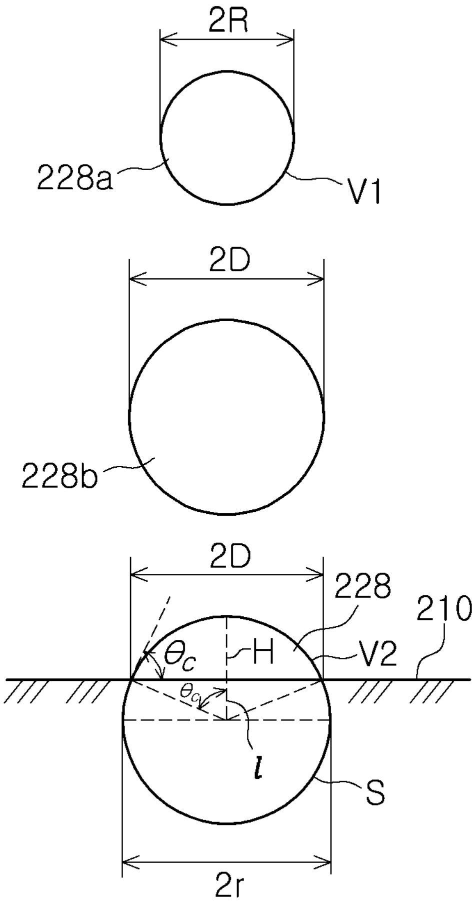
FIG. 4 illustrates a droplet volume calculating process according to a droplet inspection method using a 2D image of a droplet according to an exemplary embodiment in the present disclosure.
Figure 4:
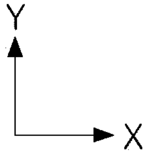

As shown in FIG. 4, the operation of pre-measuring the contact angle θc of the substrate for inspection may include: acquiring a reference image of a droplet **228*a* of ink ejected from the inkjet head 220 onto the substrate 210 using the measurement camera 230, calculating a reference volume V1 of the droplet 228 by measuring a diameter 2R of the droplet 228*a* and the contact angle θc of the substrate from the reference image, receiving an actual volume of the droplet corresponding to the reference image and comparing the received volume of the droplet with the reference volume V1, determining a correction constant C so that the reference volume V1 matches the actual volume of the droplet 228**, and acquiring the contact angle θc of the substrate for inspection by correcting the contact angle θc of the substrate with a weight according to the correction constant C.

According to the volume V formula shown in FIG. 4, the correction constant C is calculated assuming that the reference volume V1 and the actual volume are the same.

After acquiring the contact angle θc of the substrate for inspection through the operations described above, ink may be ejected onto the substrate 210 and a 2D image of a droplet 228*b* of the ejected ink may be acquired. The actual droplet is not formed in a circle like the droplet 228*b* in FIG. 4, but the diameter 2D of the droplet 228 is calculated from the 2D image, and the droplet 228*b* is assumed by reconstructing a shape of a portion of a sphere including an ellipse having the diameter 2D as a diameter.

Therefore, the controller 240 may calculate the volume V2 of the droplet 228 using the calculated diameter 2D of the droplet 228, the pre-measured contact angle θc of the substrate for inspection, and the predetermined correction constant C.

Since the diameter 2D may be rapidly calculated for multiple droplets 228 simultaneously and an ink application state may be rapidly measured using the pre-measured contact angle θc of the substrate for inspection and the determined correction constant C, the ink application state of the substrate 210 may be promptly and accurately recognized.

In addition, when the inkjet head 220 moves while ejecting ink, droplets 228 may be formed in each region of the substrate 210 as shown in FIGS. 3 and 4. In addition, the contact angle of the droplets in each region may vary depending on a coating state of the substrate 210 corresponding to each region.

Therefore, in the operation of measuring the diameter 2D of the droplet (228*a*, see FIG. 4) and the contact angle of the substrate 210 from the reference image according to an exemplary embodiment in the present disclosure, the contact angle θc of the substrate 210 may be measured for each region according to an ink region deposited for each head or each row of the substrate 210. By acquiring the contact angle θc of the substrate for inspection for each region, the ink application state of the substrate 210 may be reflected more minutely.

At this time, the contact angle θc of the substrate for inspection may be a weighted value applied to an average contact angle for each measured region.

The volume V formula shown in FIG. 4 illustrates the contact angle θc and the correction constant C of the substrate for inspection. However, the contact angle θc of the substrate for inspection may be acquired by correcting the contact angle of the substrate by applying the weight according to the correction constant C to the contact angle of the substrate.

Figure 5:
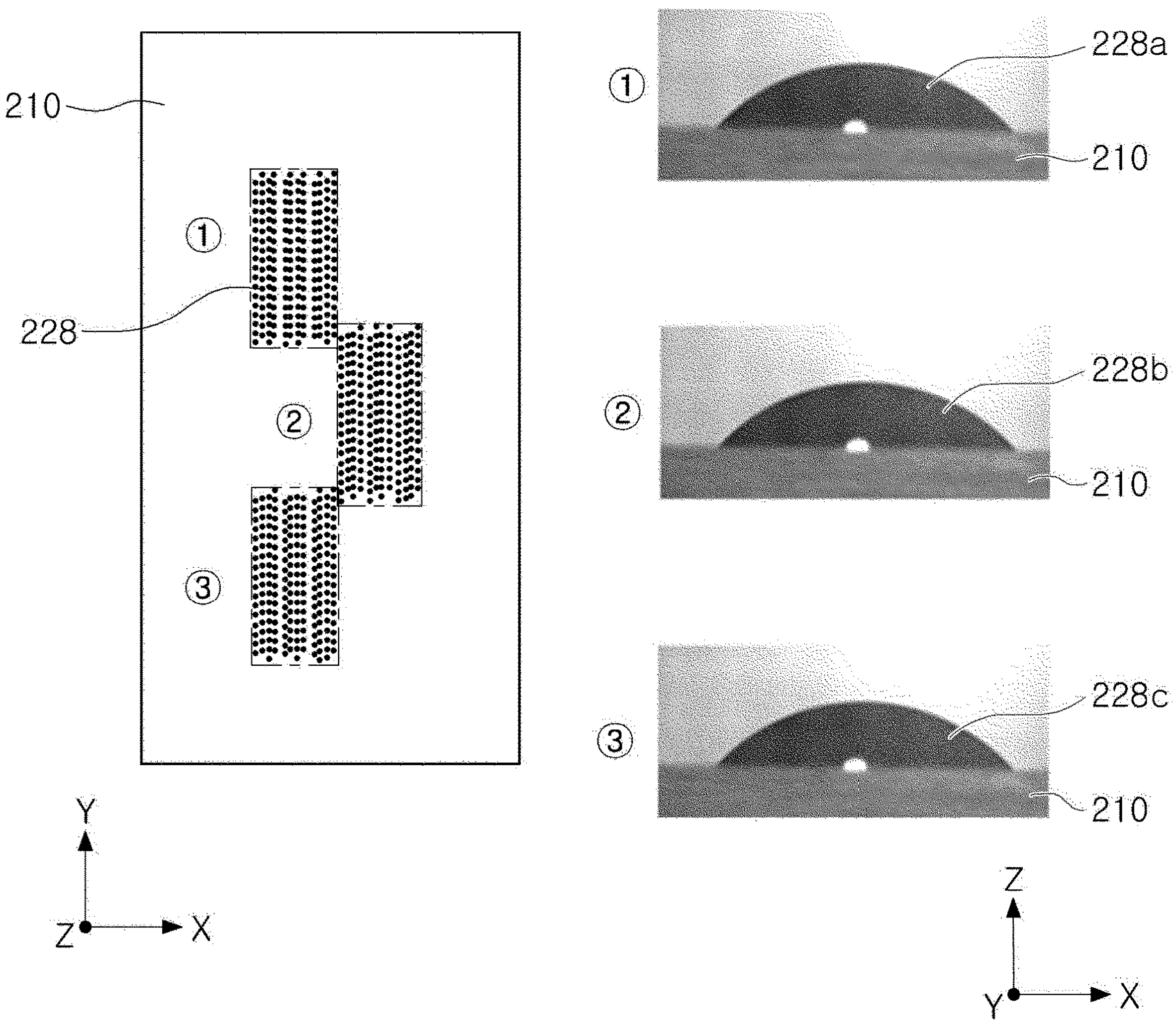
FIG. 5 illustrates a top view and a side view of droplets with different contact angles in a droplet inspection device using a 2D image of a droplet according to an exemplary embodiment in the present disclosure.

As an example, as shown in FIG. 5, the droplets 228 may be divided into regions according to the row in which the droplets 228 are formed, and the droplets 228 may be divided into regions #1, #2, and #3.

In this case, the contact angle of the substrate 210 with respect to the droplet 228*a* in the region #1, the contact angle of the substrate 210 with respect to the droplet 228*b* in the region #2, and the contact angle of the substrate 210 with respect to a droplet 228*c* in the region #3 are different from each other, and thus, the contact angles θc of the substrate for inspection for each region may be calculated in advance.

Figure 6:
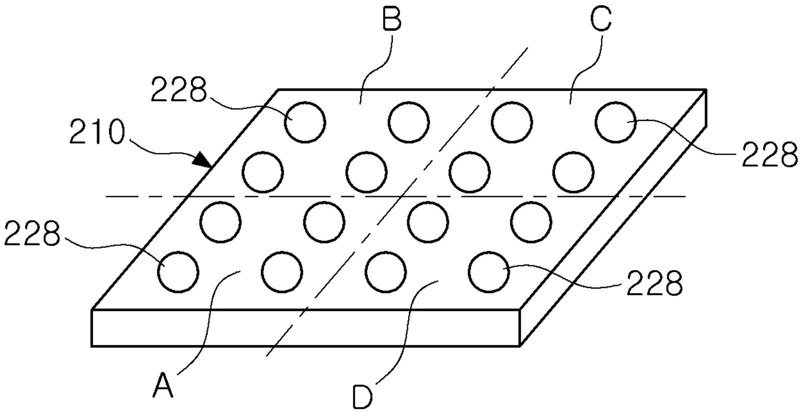
FIG. 6 illustrates a substrate from which a droplet is ejected in a droplet inspection device using a 2D image of a droplet according to an exemplary embodiment in the present disclosure.

Alternatively, as shown in FIG. 6, the substrate 210 on which the droplet 228 is formed may be divided into up, down, left and right, and classified into region A, region B, region C, and region D, and in this case, the contact angle of the substrate 210 with respect to the droplet in region A, the contact angle of the substrate 210 with respect to the droplet in region B, the contact angle of the substrate 210 with respect to the droplet in region C, and the contact angle of the substrate 210 with respect to the droplet in region D may be different, and thus, the contact angles θc of the substrate for inspection for each region may be calculated in advance.

The dividing of the region of the substrate 210 may be arbitrarily selected by the user, and may be calculated by the controller 240 in consideration of flow in which a coating state of the substrate 210 changes.

Meanwhile, the weight may be determined by reflecting additional parameters on the determined correction constant C.

As an example, the weight may be the correction constant C corrected by considering an image clarity difference value according to the depth of the measurement camera 230 or the flatness of the substrate 210.

As the size of the droplet 228 decreases and the depth of field of the measurement camera 230 increases, a focusing distance of the measurement camera 230 may increase, making it difficult to measure a height of the droplet 228, and thus, a value reflecting the ratio of the area of the substrate 210 in the 2D image according to the depth of the measurement camera 230 and the flatness of the substrate 210 to the area of the actual substrate 210 may be determined as the weight.

Alternatively, a value reflecting the ratio of the area of the ink in the 2D image according to the depth of the measurement camera 230 and the flatness of the substrate 210 to the area of the actually cured ink may be determined as the weight.

For example, if a 2D image captured within the FoV of the measurement camera 230 is divided into a plurality of regions and an area value of each region in the 2D image is 8, and in this case, if an actual area value of the region is 10, a correction constant C of 1.25 may be applied.

In addition, the ratio of an area value in the 2D image for each region to the actual area may be calculated and a different correction constant may be applied to each region.

Therefore, an operation of determining the weight based on an area error of the substrate 210 using the 2D area of the substrate 210 captured by the measurement camera 230 and the actual 2D area of the substrate 210 may be included, and in addition, if the region imaged by the measurement camera 230 includes a plurality of regions of the substrate 210, an operation of determining the weight based on an average area error for each region of the substrate 210 may be included.

However, in a case in which the substrate itself is changed and the coating state of the substrate changes, the contact angle θc of the substrate may change and the correction constant C may also need to be applied differently.

In an exemplary embodiment, if the substrate 210 is changed, an operation of additionally correcting the weight by shifting the weight before the substrate is changed by an average volume change of the droplet according to an ink region of the substrate 210 deposited for each head or each row and an operation of correcting the contact angle θc of the substrate for inspection by correcting the contact angle of the substrate with the determined weight.

Figure 7:
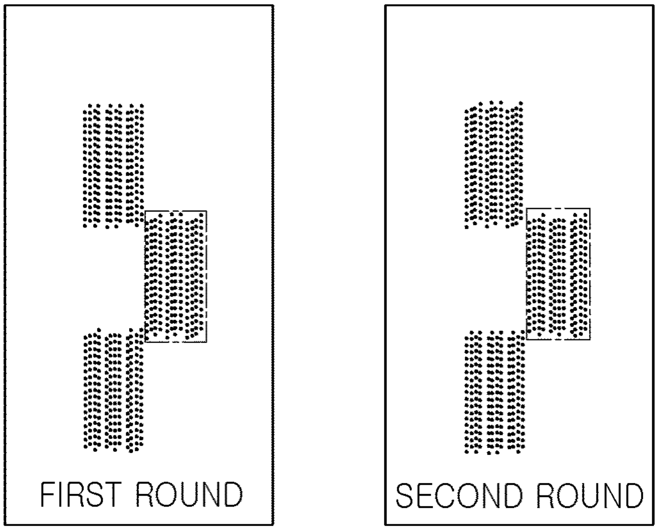
FIG. 7 is a graph illustrating a change in volume of a droplet when a substrate is changed in a droplet inspection device using a 2D image of a droplet according to an exemplary embodiment in the present disclosure.
Figure 7:
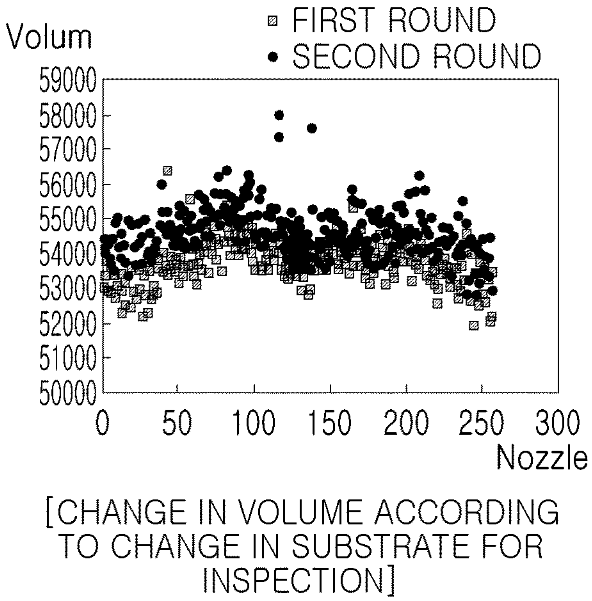
Figure 7:
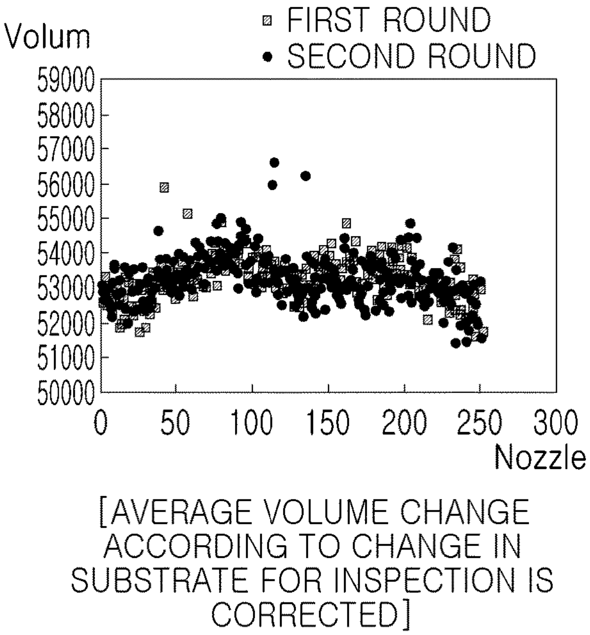

As shown in FIG. 7, assuming that a substrate 1 is used in a first round and a substrate 2 is used in a second round, the volume of the droplet 228 changes as the substrate for inspection is changed from the substrate 1 to the substrate 2. Referring to the graph illustrating the volume of the droplet 228 for each discharge nozzle, it can be seen that the overall average value moved upward in the second round compared to the first round.

At this time, rather than measuring the contact angle θc of the substrate for inspection again on the changed substrate 2, an average volume change of the droplet 228 in the first and second rounds is calculated, and the average change may be assumed to be an error and reflected in the correction constant C.

In addition, even if the substrate 210 is changed, the average volume change of the droplet 228 is calculated for each head or row, and the calculated average volume change may be assumed to be an error due to changes in the contact value of the substrate and image clarity.

As shown in the left graph of FIG. 7, it can be seen that, as the average volume change of the droplet 228 is reflected as an error on the correction constant C, the average volume values of the droplet 228 are derived to be similar even though the substrate 1 was changed to the substrate 2.

Meanwhile, the volume of the droplet 228 may be calculated using a calculation program previously stored in the controller 240.

In addition, according to an exemplary embodiment, the operation of receiving the actual volume of the droplet 228 corresponding to the reference image to determine the correction constant C may include an operation of receiving the actual volume of the droplet 228 from a database storing the actual volume, receiving the actual volume of the droplet acquired by imaging a cured droplet with a 3D measurement device, or calculating the actual volume of the droplet 228 from a 2D dot image produced by a photo process and receiving the same.

If the actual volume of the droplet 228 may be acquired, it is not limited by the above exemplary embodiment and known techniques that may be derived by a person skilled in the art may also be applied.

Then, if the calculated volume of the droplet 228 is within a predetermined allowable error range, the controller 240 may determine that the application of ink on the substrate 210 is appropriate, and if the calculated volume of the droplet 228 is outside the predetermined allowable error range, the controller 240 may determine that the application of ink on the substrate 210 is not appropriate and perform a follow-up operation on the substrate 210.

Therefore, the droplet inspection method using a 2D image of a droplet according to an exemplary embodiment may include an operation of acquiring a reference image of the droplet 228 of ink ejected from the inkjet head 220 onto the substrate using the measurement camera 230, an operation of measuring the diameter 2R of the droplet 228 and a contact angle of the substrate 210 from the reference image and calculating the reference volume V1 of the droplet 228, an operation of receiving an actual volume of the droplet corresponding to the reference image and comparing the received actual volume with the reference volume V1, an operation of determining the correction constant C so that the reference volume V1 matches the actual volume of the droplet 228, an operation of correcting the contact angle of the substrate 210 with the weight according to the determined correction constant C to acquire the contact angle θc of the substrate for inspection, an operation of acquiring a 2D image for the droplet 228 of ink ejected to a plurality of positions on the substrate 210 by the inkjet head 220 using the measurement camera 230, and an operation of calculating the diameter 2D of the droplet 228 from the 2D image and calculating the volume V2 of the droplet 228 using the calculated diameter 2D of the droplet 228 and the contact angle θc of the substrate for inspection.

In addition, in the operation of measuring the diameter 2D of the droplet 228 and the contact angle of the substrate from the reference image, the contact angle of the substrate may be measured for each region according to the ink region deposited on each head or each row of the substrate 210, and the contact angle θc of the substrate for inspection may be a weighted value applied to the average contact angle for each measured region.

The weight may be a value obtained by correcting the correction constant C by considering a difference in image clarity depending on the depth of the measurement camera 230 or the flatness of the substrate 210.

As an example, an operation of determining a weight based on an area error of the substrate 210 using a 2D area of the substrate 210 imaged by the measurement camera 230 and an actual 2D area of the substrate 210 may be further included, and in a case in which the region imaged by the measurement camera 230 includes a plurality of regions of the substrate 210, a weight may be determined based on an average area error of each region of the substrate 210. Other redundant descriptions will be omitted for clarity.

Therefore, the inkjet droplet volume measurement device according to an exemplary embodiment in the present disclosure may include the inkjet head 220 located above the substrate 210 and ejecting the droplet 228 of ink onto the substrate 210, the measurement camera 230 located on the side surface or above the substrate 210, stopped at or being movable from a plurality of positions of the substrate 210, and capturing a 2D image of the droplet 228 of ink ejected onto the substrate 210, and the controller 240 calculating the diameter of the droplet 228 and the contact angle θc of the substrate for inspection upon receiving the 2D image from the measurement camera 230 and calculating the volume of the droplet 228 using the diameter of the droplet measured in real time and the pre-measured contact angle θc of the substrate for inspection.

In an exemplary embodiment, the controller 240 may determine a weight by considering the difference value in image clarity according to the depth of the measurement camera 230 or the flatness of the substrate 210 and apply the correction constant C to the volume of the droplet 228 of ink according to the determined weight.

Specifically, the controller 240 may determine a weight based on an area error of the substrate 210 using the 2D area of the substrate imaged by the measurement camera 230 and the actual 2D area of the substrate 210, and if the region imaged by the measurement camera 230 includes a plurality of regions of the substate 210, the controller 240 may determine the weight based on an average area error of each region of the substrate 210.

In addition, in an exemplary embodiment, when the substrate 210 is changed, the controller 240 may correct the weight by shifting the weight before the substrate is changed by an average volume change of the droplet 228 according to the ink region deposited for each head and each row of the substrate 10 and correcting the contact angle of the substrate with the corrected weight, to correct the contact angle θc of the substrate for inspection.

According to an exemplary embodiment in the present disclosure, even if the contact angle of the substrate is not measured each time before measuring the volume of a droplet, the height and volume of the droplet may be calculated using the pre-measured contact angle of the substrate for inspection and droplet inspection may be performed on a plurality of droplets at high speed, thereby improving inspection efficiency.

In addition, according to an exemplary embodiment in the present disclosure, even if the contact angle of the substrate is not measured each time the substrate is changed, the contact angle of the existing substrate for inspection may be utilized by shifting the average volume change of the droplet and applying a weight, thereby rapidly performing droplet inspection.

In describing the present disclosure, '~portion' may be implemented in various manners, for example, by a processor, program instructions executed by the processor, a software module, a microcode, a computer program product, a logic circuit, an application-specific integrated circuit, firmware, etc.

The contents of the method disclosed in the exemplary embodiments of the present application may be directly implemented with a hardware processor, or may be implemented and completed through a combination of hardware and software modules in the processor. Software modules may be stored in conventional storage mediums, such as random access memory, flash memory, read only memory, programmable read only memory, or electrically erasable programmable memory, registers, etc. The storage medium is located in a memory, and the processor reads information stored in the memory and combines the read information with the hardware to complete the contents of the method described above. To prevent redundancy, detailed description is omitted here.

While example exemplary embodiments have been shown and described above, it will be apparent to those skilled in the art that modifications and variations could be made without departing from the scope of the present disclosure as defined by the appended claims.

What is claimed is:

1. A droplet inspection method using a 2-dimensional (2D) image of a droplet, the droplet inspection method comprising:

ejecting ink onto a substrate based on a preset inspection pattern using an inkjet head;

acquiring a 2D image of the droplet of ink ejected to a plurality of positions on the substrate using a measurement camera located on a side surface or above the substrate; and calculating a diameter of the droplet from the 2D image and calculating a volume of the droplet using the calculated diameter of the droplet and a pre-measured contact angle of the substrate for inspection, wherein the contract angle of the substrate for the inspection is pre-measured by acquiring a reference image of the droplet of ink ejected from the inkjet head onto the substrate using the measurement camera, calculating a reference volume of the droplet by measuring a diameter of the droplet and a contact angle of a substrate from the reference image, receiving an actual volume of the droplet corresponding to the reference image and comparing the received actual volume with the reference volume, determining a correction constant such that the reference volume matches the actual volume of the droplet, and correcting the contact angle of the substrate with a weight according to the determined correction constant to acquire the pre-measured contact angle of the substrate for the inspection.

2. The droplet inspection method of claim 1, wherein in the measuring of the diameter of the droplet and the contact angle of the substrate from the reference image, the contact angle of the substrate is measured for each region according to an ink region deposited for each head or each row of the substrate, and the contact angle of the substrate for inspection is a weighted value for an average contact angle for each measured region.

3. The droplet inspection method of claim 2, wherein the weight is a value obtained by correcting the correction constant by considering a difference value in image clarity according to a depth of the measurement camera or flatness of the substrate.

4. The droplet inspection method of claim 3, further comprising determining a weight based on an area error of the substrate using a 2D region of the substrate imaged by the measurement camera and an actual 2D region of the substrate.

5. The droplet inspection method of claim 4, wherein, when the region imaged by the measurement camera includes a plurality of regions of the substrate, the weight is determined based on an average area error for each region of the substrate.

6. The droplet inspection method of claim 2, further comprising:

when the substrate is changed, additionally correcting the weight by shifting the weight before the substrate is changed by an average volume change of the droplet according to an ink region of the substrate deposited for each head or each row; and correcting the contact angle of the substrate for inspection by correcting the contact angle of the substrate with the determined weight.

7. The droplet inspection method of claim 1, wherein the calculating of the volume of the droplet is performed by a calculation program pre-stored in the controller.

8. The droplet inspection method of claim 1, wherein the receiving of the actual volume of the droplet corresponding to the reference image includes:

receiving the actual volume of the droplet from a database storing the actual volume of the droplet or receiving the actual volume of the droplet acquired by imaging the cured droplet with a 3D measurement device, or calculating the actual volume of the droplet from a 2D dot image produced through a photo process and receiving the actual volume of the droplet.

9. The droplet inspection method of claim 1, wherein, when the calculated volume of the droplet is within a predetermined allowable error range, determining that the application of ink on the substrate is appropriate, and when the calculated volume of the droplet is outside the predetermined allowable error range, determining that the application of ink on the substrate is not appropriate and performing a follow-up operation on the substrate.

10. A droplet inspection method using a 2-dimensional (2D) image of a droplet, the droplet inspection method comprising:

acquiring a reference image of the droplet of ink ejected from an inkjet head onto a substrate using a measurement camera;

calculating a reference volume of the droplet by measuring a diameter of the droplet and a contact angle of the substrate from the reference image;

receiving an actual volume of the droplet corresponding to the reference image and comparing the received actual image with the reference volume;

determining a correction constant such that the reference volume matches the actual volume of the droplet;

acquiring a contact angle of the substrate for inspection by correcting the contact angle of the substrate with a weight according to the determined correction constant;

acquiring a 2D image of the droplet of ink ejected from the inkjet head to a plurality of positions on the substrate using the measurement camera; and calculating a diameter of the droplet from the 2D image and calculating a volume of the droplet using the calculated diameter of the droplet and the contact angle of the substrate for inspection.

11. The droplet inspection method of claim 10, wherein in the measuring of the diameter of the droplet and the contact angle of the substrate from the reference image, the contact angle of the substrate is measured for each region according to an ink region deposited for each head or each row of the substrate, and the contact angle of the substrate for inspection is a weighted value for an average contact angle for each measured region.

12. The droplet inspection method of claim 11, further comprising, when the substrate is changed, additionally correcting the weight by shifting the weight before the substrate is changed by an average volume change of the droplet according to an ink region of the substrate deposited for each head or each row; and correcting the contact angle of the substrate for inspection by correcting the contact angle of the substrate with the determined weight.

13. The droplet inspection method of claim 10, wherein the weight is a value obtained by correcting the correction constant by considering a difference value in image clarity according to a depth of the measurement camera or flatness of the substrate.

14. The droplet inspection method of claim 13, further comprising determining a weight based on an area error of the substrate using a 2D region of the substrate imaged by the measurement camera and an actual 2D region of the substrate.

15. The droplet inspection method of claim 14, wherein, when the region imaged by the measurement camera includes a plurality of regions of the substrate, the weight is determined based on an average area error for each region of the substrate.

16. An inkjet droplet volume measurement device using a 2-dimensional image of a droplet, the inkjet droplet volume measurement device comprising:

an inkjet head located above a substrate and ejecting a droplet of ink onto the substrate;

a measurement camera located on a side surface or above the substrate, stopped at or movable from a plurality of positions of the substrate, and imaging a two-dimensional (2D) image of a droplet of ink ejected onto the substrate; and a controller receiving the 2D image from the measurement camera, calculating a diameter of the droplet and a contact angle of a substrate for inspection, and calculating a volume of the droplet using a real-time measured diameter of the droplet and a pre-measured contact angle of the substrate for inspection, wherein the contract angle of the substrate for the inspection is pre-measured by acquiring a reference image of the droplet of ink ejected from the inkjet head onto the substrate using the measurement camera, calculating a reference volume of the droplet by measuring a diameter of the droplet and a contact angle of a substrate from the reference image, receiving an actual volume of the droplet corresponding to the reference image and comparing the received actual volume with the reference volume, determining a correction constant such that the reference volume matches the actual volume of the droplet, and correcting the contact angle of the substrate with a weight according to the determined correction constant to acquire the pre-measured contact angle of the substrate for the inspection.

17. The inkjet droplet volume measurement device of claim 16, wherein the controller determines a weight by considering a difference value in image clarity according to a depth of the measurement camera or flatness of the substrate and applies a correction constant to the volume of the droplet of ink according to the determined weight.

18. The inkjet droplet volume measurement device of claim 17, wherein the controller determines a weight based on an area error of the substrate using a 2D region of the substrate imaged by the measurement camera and an actual 2D region of the substrate, and when the region imaged by the measurement camera includes a plurality of regions of the substrate, the controller determines the weight based on an average area error for each region of the substrate.

19. The inkjet droplet volume measurement device of claim 16, wherein, when the substrate is changed, the controller corrects the weight by shifting the weight before the substrate is changed by an average volume change of the droplet according to an ink region of the substrate deposited for each head or each row.

* * * * *